US012653201B2

(12) United States Patent (10) Patent No.: US 12,653,201 B2
Arnason (45) Date of Patent: Jun. 16, 2026

(54) SPIRAL-PUMP FOR TREATING FOOD ITEMS

(71) Applicant: Lambhusasund EHF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 0 days.

(21) Appl. No.: 17/771,398

(22) PCT Filed: Oct. 22, 2020

(86) PCT No.: PCT/IS2020/050019
§ 371 (c)(1),
(2) Date: Apr. 22, 2022

(87) PCT Pub. No.: WO2021/079385
PCT Pub. Date: Apr. 29, 2021

(65) Prior Publication Data
US 2022/0386632 A1 Dec. 8, 2022

(51) Int. Cl.
*A22C 17/08* (2006.01)
*A01K 61/13* (2017.01)
*A01K 63/04* (2006.01)
*A22C 25/02* (2006.01)
*A22C 25/08* (2006.01)

(52) U.S. Cl.
CPC .............. *A22C 17/08* (2013.01); *A01K 61/13* (2017.01); *A01K 63/04* (2013.01); *A22C 25/02* (2013.01); *A22C 25/08* (2013.01)

(58) Field of Classification Search
None
See application file for complete search history.

(56) References Cited

U.S. PATENT DOCUMENTS 3,489,074 A 1/1970 Farkas
3,586,510 A * 6/1971 Farkas et al. ............. A23L 5/11
99/452

(Continued)

FOREIGN PATENT DOCUMENTS

EP 0237262 A2 9/1987
EP 0272087 A2 6/1988

(Continued)

OTHER PUBLICATIONS

International Search Report and Written Opinion dated Feb. 9, 2021 for corresponding International Application No. PCT/IS2020/050019.

(Continued)

*Primary Examiner* — Thor S Campbell
(74) *Attorney, Agent, or Firm* — Tarolli, Sundheim, Covell & Tummino LLP

(57) ABSTRACT

The present invention relates to a method and a device for treating and/or transporting food items. The apparatus and method are designed to facilitate treating animals or food items in liquid. The device of the present invention is designed as a spiral pump with a tubing that is wound together with a rotating structure around a horizontal axis. The apparatus of the present invention and the use thereof provides a method to treat living or slaughtered animals or food items in a spiral pump.

22 Claims, 5 Drawing Sheets

(56) References Cited

U.S. PATENT DOCUMENTS

| 3,788,392 | A | * | 1/1974 | Abbott | F28D 11/04 |
| | | | | | 366/147 |
| 4,331,070 | A | * | 5/1982 | Denk | A23B 11/1334 |
| | | | | | 99/464 |
| 4,596,286 | A | * | 6/1986 | Stetler | F28D 11/04 |
| | | | | | 165/92 |
| 4,830,865 | A | * | 5/1989 | McFarlane | A23B 2/465 |
| | | | | | 426/399 |
| 5,275,091 | A | * | 1/1994 | McFarlane | A23B 7/005 |
| | | | | | 99/356 |
| 7,784,397 | B2 | * | 8/2010 | Vedsted | A23B 4/005 |
| | | | | | 99/356 |
| 2018/0255749 | A1 | | 9/2018 | Wiesman | |

FOREIGN PATENT DOCUMENTS

| EP | 0550836 A2 | 7/1993 | |
| WO | WO-2005085521 A1 * | 9/2005 | A23B 4/005 |
| WO | WO-2018185791 A1 * | 10/2018 | A22C 25/02 |

OTHER PUBLICATIONS

Iceland Search Report dated Feb. 21, 2020 for corresponding Application No. IS 9128.

* cited by examiner

SPIRAL-PUMP FOR TREATING FOOD ITEMS

RELATED APPLICATIONS

The present application is a U.S. National Stage application under 35 USC 371 of PCT Application Serial No. PCT/IS2020/050019, filed on 22 Oct. 2020; which claims priority from IS Patent Application No. 9128, filed 22 Oct. 2019, the entirety of both of which are incorporated herein by reference.

FIELD OF THE INVENTION

The invention relates to a method and a device for treating and transferring living or slaughtered animals or food items. Such method and device may, for instance, be used to remove sea lice from salmon.

BACKGROUND

In the demanding field of food processing and the demand for better quality and delivery of fresh products to the market, a constant development is taking place for improved methods and devices. Processing steps such as cooling, rinsing, bleeding of freshly slaughtered animals need to be able to facilitate fast, efficient but relatively gentle handling and transportation of the animals and food products through these processes.

The salmon farming industry has been growing steadily since the 1980s and is today a thriving industry in countries such as Chile, Norway and Iceland. One of the problems the salmon farming industry is facing is the management of sea lice, but many solutions have been tested both medicinal as well as non-medicinal. With respect of the environment and demand for more naturally farmed fish, non-medicinal ways of reducing sea lice are desirable.

One way of dealing with sea lice is the use of skirts such as tarpaulin sheets implemented across the upper portion of marine pens to prevent hatching sea lice larvae from migrating down to the lower portion of the pen and attach to the salmon. This solution requires monitoring and manipulation of oxygen levels in the upper part of the pen to make this approach more effective. Snorkel tubes have also been used to increase the oxygen level lower in the pen and therefore reducing the need of the salmon to swim to the upper portion of the pen for uptake of air into its swim bladders. Active measures such as water jets and lasers have been used to physically detach lice of the salmon, where the laser actually kills the lice but the water jet system is implemented in a defined area and only detaches the lice from the skin of the salmon and the lice are separated from the salmon in the defined area. Semi-physical measures such as traps have also been used, but they work in similar manner as traps for flies.

One of the problems in the food industry is getting rid of bacteria such as Listeria in Salmon and Salmonella in chicken. For Listeria, the solution has been to freeze the salmon to get rid of this bacteria. This however poses a problem for delivery of fresh salmon for the market.

Spiral pumps have been used to transport items delicately through a closed environment in a low-pressure system. Such pumps are ideal for pumping water-mixed material such as raw and cooked shrimp, shellfish and pelagic and other small fish according to the principle of Archimedes. By rotating slowly, the pump facilitates transport and/or elevation of water and material through pipes, without using any propeller.

SUMMARY OF THE INVENTION

The present invention provides a new method, system and a device for treating, processing and/or transporting living or slaughtered animals or food items. The apparatus and method are designed to facilitate gentile treatment of living or slaughtered animals or food items in liquid as they are conveyed in a closed environment. The system also prevents the items from being exposed to the outside environment. The use of spiral pump, working according to the principle of Archimedes, have been proven useful for treatment and transfer of food items. However, treatment of a large amount of food items or living animals requires large equipment with increased treatment volume, such as larger diameter of tubing in a spiral pump.

In some embodiments the apparatus comprises a spiral shaped tubing with an in-feed device which receives a flow of returning liquid from the out-feed end of the tubing as a source of power for an ejector mechanism at the in-feed end of the apparatus in combination with the power of the suction provided by the spiral shaped tubing. Thereby, suction power of a traditional spiral pump is augmented by using an ejector device at the in feed end of the spiral pump device to generate a gentle but increased suction power as well as re-using a portion of the transfer and treatment liquid. This is facilitated by a loading structure which comprises an ejector portion or ejector structure prior to the in-feed end of the tubing of the spiral pump. This provides a solution for feeding a large diameter spiral pump in a more gentle manner than using traditional vacuum devices for the in-feed step, for example when feeding live fish into a pumping device for treatment before returning the fish back to a pen.

In some embodiments the apparatus comprises the new device has an alternately changing diameter of the tubing of the pump to alter the pressure in the tubing and to alter the flow of liquid against the living or slaughtered animals or food items. By narrowing and widening the diameter of the tubing, the flow of liquid in the pump will function as mechanical forwarding of the liquid which increases the stimulus or irritation on the surface of the items to be treated. The alternating increasing and decreasing diameter in each channel creates an alternating increase and decrease in the flow of liquid around the food items in the channel. Furthermore, altering the flow rate of the liquid around the food items increases the treatment effect of the device, such as cooling or heating.

In some embodiments the tubing of the pumping device is arranged to thread the in-feed end through the centre space of the windings to exit by the last winding of the pumping device and the out-feed end is threaded through the centre space of the windings to exit by the first winding of the pumping device.

The device of the present invention is designed as a pumping device with tubing, which is wound in a spiral and rotates around a substantially horizontal axis and a leading structure with an ejector function/structure for feeding the living or slaughtered animals or food items into the first winding of the pumping device. The new method and apparatus can further be provided with additional and serially connected spiral pumps for treating food living or slaughtered animals or food items having been transferred into and pumped through the first spiral pump. The new method is performed by using a combined suction from a spiral pumping device and an ejector portion of the loading structure to get a the in-feeding into the pump started and continued. The principle of Archimedes ensures that if the total amount of liquid, food items and additives does not exceed 50% of the volume of a winding the food items in the winding do not mix with the food items in the next winding and the air filling about 50% or more of the volume of the winding pushes the content of a prior winding to the next one. The method and device of the present invention uses a spiral pump to treat living or slaughtered animals or food items in liquid media, where the temperature and salt concentration of the liquid media can be set to serve the purpose of the treatment.

The device and method of the present invention is further suitable for reducing or eliminating parasites such as sea lice off farmed salmon by pumping salmon from one pen to another or to separated space within a pen through at least one pumping device. By using a number of serially connected spiral pumps with different temperature than in the temperature of the pen and thereby subjecting the salmon briefly to a temperature difference ($\Delta$T) the sea lice are detached from the skin of the fish. As the pumping devices are neither complicated nor space consuming the can be set up on a structure next to a pen or on the deck of a vessel and due to the suction properties of the first pumping device of the invention farmed fish can be effectively sucked out of the pen and into the first pump. The detachment of lice from salmon fish is obtained due to the size difference of the salmon fish and the sea lice, as well as the fat content of salmon fish, because the salmon fish can tolerate the temperature difference for a short period of time, but the sea lice cannot. The combination of one or more of the following embodiments provide the solutions presented herein: a) use of an ejector device in a loading structure to feed food items into a pumping device allowing treatment of food items in temperature and/or salt controlled liquid, b) subjecting food items to temperature difference using the transportation liquid in the pumping device, c) the effect of the flow speed and alternating pressure in the tubing of the pumping device to increase the effect of the liquid in the pump during treatment, and d) the rubbing of the food items against each other and the inner surface of the piping which provides the improved device and method of the present invention resulting in increased effect of the transportation (treatment) liquid providing a solution.

Furthermore, the use of $\Delta$T in the treatment process provides an increased treatment effect but does not harm the live fish or reduces the quality of the slaughtered fish or food items being treated. Although the methods of the application are directed towards live fish or slaughtered and gutted fish, they may be applicable to other food items or objects. Embodiments such as using different temperature for the first and the second pumping device and to provide a different diameter of the tubing and altering the flow of liquid in the pumping during the treatment provides increased efficiency of the treatment as the liquid is passed by the slaughtered animals or live fish repeatedly and the use of $\Delta$T between steps enhances the treatment effect even further.

One of the challenges in modern food industry is to reduce the amount of water used in producing food as well as using as much of the animals slaughtered for production of food. This includes exploring use of parts of the animals not used before and managing waste material in an environmental manner. The device and method of the present invention is very suitable for treatment of live fish or slaughtered animals and food items in the aim of reducing water as the salt and temperature controlled liquid is re-circulated through heat exchange devices and the salt concentration is adjusted if it alters in the pump during treatment.

It is an object of the present invention to overcome and/or ameliorate the aforementioned drawbacks of the prior art and to provide an improved and/or alternative and/or additional method or device for facilitating processing or treatment living or slaughtered animals or food items using spiral pump(s). It is one preferred object of the present invention to provide a method and device to facilitate treatment of living or slaughtered animals or food items using the spiral pump of the present invention. Moreover, it is a preferred object of the present invention to provide a method and device, preferably designed to treat living farmed salmon to reduce or eliminate sea lice from the salmon. Another preferred object of the present invention is to provide a device having a design where the in-feeding end of the tubing of the pump is connected to a loading structure to load items such as fish into the pumping device and an ejector structure is arranged within a loading channel to facilitate suction of items in liquid into the first winding of the pump. An important aspect of the present invention providing a pump with alternately changing diameter of alter the flow of liquid in the pump and thereby increasing the treatment effect in the pump.

The object(s) underlying the present invention is (are) particularly solved by the features defined in the independent claims. The dependent claims relate to preferred embodiments of the present invention. Further additional and/or alternative aspects are discussed below.

Thus, at least one of the preferred object of the present invention is solved by an apparatus for treating living or slaughtered animals or food items in liquid media. The apparatus comprises a first pumping device which comprises i) a tubing with an in-feed end and an out-feed end, said tubing being wound in a spiral having three or more windings, wherein the spiral wound tubing is arranged to be rotated around an axis, and ii) a loading structure connected to the in-feed end of the tubing for loading the first winding of the spiral wound tubing with living or slaughtered animals or food items in liquid media. Furthermore, the loading structure further comprises a) an in-feed opening for receiving living or slaughtered animals or food items in liquid media, b) at least one fluid inlet to feed additional liquid into the loading structure, and c) an ejector device arranged prior to the in-feed end of the spiral wound tubing to provide suction of living or slaughtered animals or food items in liquid media into the first winding of the spiral wound tubing.

Another preferred object of the present invention is solved by a method for treating living or slaughtered animals or food items in liquid media. The method comprises the steps of:

a) providing a pumping device, said pumping device further comprising: i) a tubing with an in-feed end and an out-feed end, said tubing being wound in a spiral having three or more windings, wherein the spiral wound tubing is arranged to be rotated around an axis, ii) a loading structure connected to the in-feed end of the tubing for loading the first winding of the spiral wound tubing with living or slaughtered animals or food items in liquid media, iii) an out-feed structure near or at the out-feed end of the spiral wound tubing to separate a portion or all the liquid from the living or slaughtered animals or food items, iv) at least one piping for redirecting a portion or all the liquid from the out-feed structure to the loading structure, b) feeding a first portion of living or slaughtered animals or food items in liquid media through an if-feed opening in the loading structure and through the in-feed end of the piping into the first winding of the spiral wound tubing, c) rotating the spiral wound tubing of the pumping device a full cycle and thereby drawing a second portion of living or slaughtered animals or food items in liquid media into the first winding, d) separating a portion or all the liquid from the living or slaughtered animals or food items in the out-feed structure, e) redirecting a portion or all the liquid from the out-feed structure through the piping to the loading structure, f) repeating steps b)-e) while there are food items to be feed into the first winding of the spiral wound tubing.

Furthermore, the liquid being redirected to loading structure is fed through a fluid inlet in the loading structure, and an ejector device is arranged prior to the in-feed end of the spiral wound tubing to provide additional suction to the suction of living or slaughtered animals or food items in liquid media into the first winding of the spiral wound tubing.

One of the preferred objects of the present invention is solved by an apparatus for treating living or slaughtered animals or food items in liquid media, where the apparatus comprises a first pumping device further comprising a tubing with an in-feed end and an out-feed end, said tubing being wound in a spiral having three or more windings, wherein the spiral wound tubing is arranged to be rotated around an axis. Furthermore, the tubing is arranged to thread the in-feed end through the centre space of the spiral wound tubing to exit by the last winding of the pumping device and the out-feed end is threaded through the centre space of the windings to exit by the first winding of the pumping device.

Another preferred object of the present invention is solved by a method for treating living salmon fish in liquid media. The method comprises the steps of:

a) providing a pumping device further comprising a loading structure with an ejector device on a platform or a structure next to a first fish farming pen, b) performing the method steps of the present invention to pump salmon fish from the first fish farming pen through the pumping device, c) separating the liquid from the salmon fish as the salmon fish exits the first spiral pump, d) transferring the salmon fish into the first or a second fish farming pen.

Another preferred object of the present invention is solved by an apparatus for treating living or slaughtered animals or food items in liquid media, where the apparatus comprises a first pumping device further comprising a tubing with an in-feed end and an out-feed end, said tubing being wound in a spiral having three or more windings, wherein the spiral wound tubing is arranged to be rotated around an axis. Furthermore, the diameter of the tubing is narrowed and widened alternatively through the winding to alternate the speed of flow in the tubing.

Another preferred object of the present invention is solved by an apparatus for treating living or slaughtered animals or food items in liquid media, the apparatus comprising a first pumping device further comprising: i) a tubing with an in-feed end and an out-feed end, said tubing being wound in a spiral having three or more windings, wherein the spiral wound tubing is arranged to be rotated around an axis, ii) a loading structure connected to the in-feed end of the tubing for loading the first winding of the spiral wound tubing with living or slaughtered animals or food items in liquid media, iii) an out-feed structure near or at the out-feed end of the spiral wound tubing to separate a portion or all the liquid from the living or slaughtered animals or food items, and iv) at least one piping for redirecting a portion or all the liquid from the out-feed structure to the loading structure. Furthermore, the loading structure further comprises a) an in-feed opening for receiving living or slaughtered animals or food items in liquid media, b) at least one fluid inlet to feed redirected liquid from the out-feed structure into the loading structure, and c) an ejector device arranged prior to the in-feed end of the spiral wound tubing to provide suction of living or slaughtered animals or food items in liquid media into the first winding of the spiral wound tubing.

Another preferred object of the present invention is solved by an apparatus for treating living or slaughtered animals or food items in liquid media, where the apparatus comprises a first pumping device further comprising; i) a tubing with an in-feed end and an out-feed end, where the tubing has three or more windings, ii) a horizontally rotating frame/support structure, where the tubing is formed in a spiral in connection with rotating frame/support structure, iii) a loading channel connected to the in-feed end of the tubing for loading the first winding of the pump with living or slaughtered animals or food items in liquid media, iv) a motor, and v) control means, where the control means controls the motor and the motor rotates the horizontally rotating frame/support structure. The device then further comprises a pump tubing of a vacuum pump being connected to the loading channel via a valve to facilitate suction in the loading channel for feeding the first portion of living or slaughtered animals or food items in liquid media into the first winding of the pump. The pump tubing of a vacuum pump may be connected to the loading channel near the connection to the in-feed end of the tubing.

In the present context the term "pumping device", relates to an device having a tubing with an in-feed end and an out-feed end, said tubing being wound in a spiral having three or more windings, wherein the spiral wound tubing is arranged to be rotated around an axis.

In the present context the term "substantially horizontally arranged", means that the spiral wound tubing is positioned in a horizontal manner, but can be tilted to have an angle where the in-feed end is higher or lower than the out-feed end.

In the present context the terms "full cycle" and "cycle of rotation" refers to a 360° rotation of the frame structure and the tubing wound around the frame structure. The rotation of the frame structure may be stopped at any position of each full cycle for feeding a blend into the tubing, but the rotation can also be continuous.

In the present context the terms "treating food items", "treating food items in liquid media" and "processing or treating food items in liquid" relate to rinsing, washing, bleeding, cooling or adding substances to food items such as, but not limited to, salts, phosphates or anti-bacterial agents etc.

In the present context the term "food items" refers to any food items such as slaughtered animals, such as, but not limited to fish or chicken, as well as for parts of animals such as aquatic animals, birds or other smaller slaughtered animals.

In the present context the terms "salmon" or "salmon fish" refers to species of the ray-fined fish in the Salmonidae family, comprising Salmon, trout, char, grayling and white-fish. In the present context the salmon fish is wild or farmed.

In an embodiment of the present invention the ejector device is a structure formed within the loading structure.

In an embodiment of the present invention the apparatus further comprises an out-feed structure near or at the out-feed end of the spiral wound tubing to separate a portion or all the liquid from the living or slaughtered animals or food items.

In an embodiment of the present invention the loading structure comprises one or more fluid inlets to feed additional liquid into the loading structure.

In an embodiment of the present invention the apparatus further comprises one or more piping for redirecting a portion or all the liquid from the out-feed structure to the loading structure.

In an embodiment of the present invention the apparatus further comprises means for regulating or setting the temperature and/or the salt concentration of the liquid in the piping for redirecting a portion or all the liquid from the out-feed structure to the loading structure before it is injected back into the first winding of the spiral wound tubing.

In an embodiment of the present invention the piping for redirecting a portion or all the liquid from the out-feed structure to the loading structure further comprises one or more sensing means for determining the temperature and/or the salt concentration of the liquid in the piping being redirected from the out-feed structure. The piping may comprise sensors for measuring salt concentration and the temperature of the solution exiting the pump. The piping may have valves to inject concentrated salt solution or water to adjust the salt concentration of the pumping liquid. The sensors and the valves are connected to a control computer, which regulates the salt concentration of the pumping liquid and maintains the salt concentration at a predetermined value. In the same manner a sensor measures the temperature of the solution and a heat exchange device ensures that a constant temperature of the pumping liquid is maintained. A filtering device may also be present in the piping to filter out debris and dead sea lice before passing the pumping liquid through the heat exchange device and back into the pump.

In an embodiment of the present invention the apparatus further comprises an air/gas separating device at or near the out-feed structure for separating the air/gas phase from the content exiting the pump.

In an embodiment of the present invention the apparatus further comprises a duct for circulating the air/gas phase from the air/gas separating device back to the in-feed end of the tubing or the in-feed structure. This creates a closed circulation of air or gas in tubing/duct which can be beneficial for using the pump to treat live fish, slaughtered animals or food items with gasses such as ozone. The ozone is then kept contained in a closed circulation. A sensor can be placed in the duct to monitor the gas level and the duct may have a valve connected to a control computer for regulating the concentration of a gas in the duct by injections if needed. In such an embodiment an air/gas separating device at the out-feed end of the pump is used for separating the air/gas phase from the content exiting the pump and re-directed into the inlet or first winding of the pump. The air/gas may also be exited from the last winding of the pumping device via a valve using the pressure in the winding to redirect the gas back into the inlet or first winding of the pump.

In an embodiment of the present invention the apparatus further comprises means injecting additional gas or air into the duct during the recirculation.

In an embodiment of the present invention the duct for circulating the air/gas phase from the air/gas separating device back to the in-feed end of the tubing or the in-feed structure further comprises one or more sensing means for determining the composition of the air-phase in the duct.

In an embodiment of the present invention the apparatus further comprises: i) a motor, and ii) a control means, wherein the control means controls the motor and the motor rotates the spiral wound tubing.

In an embodiment of the present invention the tubing is wound around and/or into a rotating frame/support structure.

In an embodiment of the present invention the spiral wound tubing is made from metal.

In an embodiment of the present invention the apparatus further comprises a second pumping device, said second pumping device comprising a spiral wound tubing with an in-feed end and an out-feed end, wherein said second pumping device is connected to the first pumping device to receive the living or slaughtered animals or food items for treatment in a second liquid.

In an embodiment of the present invention the apparatus further comprises a third pumping device, said second pumping device comprising a spiral wound tubing with an in-feed end and an out-feed end, wherein said third pumping device is connected to the second pumping device to receive the living or slaughtered animals or food items for treatment in a third liquid.

In an embodiment of the present invention the apparatus further comprises a loading structure, said loading structure further comprising i) an in-feed opening for receiving living or slaughtered animals or food items in liquid media from a previous pumping device, and ii) at least one fluid inlet to feed additional liquid into the loading structure.

In an embodiment of the present invention the apparatus further comprises an ejector device arranged prior to the in-feed end of the spiral wound tubing to provide suction of living or slaughtered animals or food items in liquid media into the first winding of the spiral wound tubing.

In an embodiment of the present invention the second and/or third pumping devices further comprise a liquid inlet to feed liquid into the first winding of the spiral wound tubing In an embodiment of the present invention the second and/or third pumping devices further comprise an out-feed structure near or at the out-feed end of the tubing to separate the liquid and/or air-phase from the living or slaughtered animals or food items have been transferred.

In an embodiment of the present invention the second and/or third pumping devices further comprise piping for redirecting a portion or all the liquid from the out-feed structure to the loading structure.

In an embodiment of the present invention the second and/or third pumping devices further comprise a duct for circulating the air/gas phase from the out-feed structure device back to the in-feed end of the tubing or the in-feed structure.

In an embodiment of the present invention the one or more of the pumping devices is arranged to thread the in-feed end through the centre space of the windings to enter by the last winding of the pumping device and wherein the out-feed end is threaded through the centre space of the windings to enter by the first winding of the pumping device.

In an embodiment of the present invention the diameter of the spiral wound tubing of one or more of the pumping devices is narrowed and widened alternatively through the winding to alternate the speed of flow in the spiral wound tubing.

In an embodiment of the present invention the one or more of spiral wound tubing of the one or more of the pumping devices is a semi-circular winding. In such an embodiment the one or more semi-circular winding around the frame structure has a rectangular, pentagonal, hexagonal, heptagonal, octagonal, nonagonal, decagonal shape or where a circular winding has one or more ridges or indents in the circular shape.

In an embodiment of the present invention the spiral wound tubing is substantially horizontally arranged to be rotated around an axis.

In an embodiment of the present invention the substantially horizontally arranged spiral wound tubing is tilted to have an angle where the in-feed end is 1-15 degrees higher or lower than the out-feed end.

In an embodiment of the present invention two or more pumping devices are serially connected to facilitate treatment of living or slaughtered animals or food items in liquid media by separating the liquid from the living or slaughtered animals or food items after transporting through a previous pumping device and then providing a new pumping and treatment liquid for each pumping device to perform two similar or different treatment steps to the living or slaughtered animals or food items.

In an embodiment of the present invention a second and a third pumping devices are serially connected after the first pumping device to facilitate treatment of living or slaughtered animals or food items in liquid media by separating the liquid from the living or slaughtered animals or food items after transporting through the first pumping device and then providing a second and third pumping and treatment liquid for the second and third pumping device respectively to perform two similar or different treatment steps to the living or slaughtered animals or food items.

In an embodiment of the present invention a method for treating living salmon fish comprises:

a) providing a pumping device further comprising a loading structure with an ejector device on a platform or a structure next to a first fish farming pen, b) performing the method steps of the present invention of feed and pump salmon fish from the first fish farming pen through the pumping device, c) separating the liquid from the salmon fish as the salmon fish exits the first spiral pump, d) transferring the salmon fish into the first or a second fish farming pen or to a subsequent pumping device.

In an embodiment of the present invention a method for treating living salmon fish further comprises:

e) feeding the salmon fish into a second pumping device together with a first treatment liquid, f) transferring the salmon fish through the second pumping device, g) separating the first treatment liquid from the salmon fish as the salmon fish exits the second pumping device.

In an embodiment of the present invention a method for treating living salmon fish further comprises:

h) feeding the salmon fish into a third pumping device together with a second treatment liquid, i) transfer the salmon fish through the third pumping device, j) separating the second treatment liquid from the salmon fish as the salmon fish exits the third pumping device, k) transferring the salmon fish into the first or a second fish farming pen.

In an embodiment of the present invention the first and second treatment liquids are temperature and salt regulated/controlled.

In an embodiment of the present invention the temperature of the first treatment liquid is lower than the temperature of the liquid in the first fish farming pen and wherein the temperature of the second treatment liquid is higher than the temperature of the liquid in the first fish farming pen.

In an embodiment of the present invention the salt concentration is increased or reduced in the first and/or second treatment liquid.

In an embodiment of the present invention the method is performed to remove sea-lice from the fish.

In an embodiment of the present invention the apparatus further comprises a sensor for determining the position of the windings of the pump in each cycle of rotation.

In an embodiment of the present invention two or more pumps are serially connected to provide separate treatment in separate pumps. In such an embodiment the first pump can provide treatment for a certain time period with liquid at a predetermined temperature (for example at 60° C. for 15 sec). The blend is then discharged from the pump and the liquid separated from the food items. The items are mixed with new chilled liquid or even fluid ice (for example at −10° C. in for 30 sec). The treatment in the first pump heats the surface before rapid cooling in the second pump, which facilitates reduction or elimination of bacteria, may provide improved bleeding and speed of bleeding and increase efficiency of further processing of food items such as fish.

Furthermore, better control of in-feeding, speed of rotation and location of the tubing of the pump at all times enhances the advantages of serial connection of pumps and synchronising their operation.

In an embodiment of the present invention food items are subjected to bacterial treatment by rapid treatment in one or more windings at a temperature such as 60° C. and then subsequently subjecting the same food items to rapid cooling at a temperature such −20° C.

In an embodiment of the present invention food items are subjected to loosening membranes from the food items or skin from animals or animal parts by rapid treatment in one or more windings at a temperature such as 60° C. and then subsequently subjecting the same food items to rapid cooling at a temperature such −4° C.

In an embodiment of the present invention the out-feed end of the pipe is formed into channels or semi-channels to distribute the food items laterally as the food items are fed out of the apparatus.

In one aspect a method is provided using one or more pumps of the invention to loosen skin and membranes from the fish before processing, where slaughtered fish is sub-chilled to a homogenous temperature at between −0.1 to −2° C. Subsequently the fish is subjected to a higher temperature, such as between 25-60° C. for a short period of time in one or more windings of the pump, such that only the surfaces (skin and abdomen) is heated. This will result in the in increased (expanded) surface volume of membranes and skin as compared to the flesh/meat. Next the fish is subjected to cooling in one or more windings of the pump or a subsequent pump at a temperature below the temperature of the flesh. This results in shrinking of membranes and skin as they freeze.

In an embodiment of the present invention ozone is used for anti-bacterial treatment of food objects as the pump comprises a closed system for the ozone. The ozone is pumped into a selected winding of the spiral pump, such that the air/gas phase can only be advanced forward in the pump but is now able to flow out of the in-feed opening of the pump. By using feeding pipes connected to the tubing of the pump, air/gas or liquid into a selected winding of the pump and in the same manner to extract air/gas or liquid from a selected winding of the pump.

In an embodiment to this object, the method relates to treating live fish and the reservoir is a separated area in one or more sea pen, whereas the pumping devices are positioned on a mooring structure or on a vessel.

In an embodiment of the present invention the apparatus being set up on a vessel or on a structure adjacent to a pen structure for farming salmon.

In an embodiment of the present invention the temperature difference between the liquids used in two serially connected pumping devices is 10 to 50° C., or 15 to 45° C., or 20 to 40° C., such as 25 to 30° C.

In an embodiment of the present invention the temperature of the liquid used in heating the salmon for killing sea lice is between 12 and 28° C., or 15 to 28° C., or 20 to 28° C., such as 24 to 28° C.

In an embodiment of the present invention the apparatus further comprises a cooling system or a heat exchange device bringing the liquid for treating the live fish, slaughtered animals or food items to a predetermined temperature and for making the liquid a salt controlled and temperature controlled solution.

In an embodiment of the present invention the liquid separated in the liquid outlet of the pumping device is filtered before re-circulated the liquid through the heat exchange element and back the in-feed end of the pumping device.

In an embodiment of the present invention the liquid separated in the liquid outlet of the pumping devices is filtered before redirecting the liquid through the heat exchange element.

In an embodiment of the present invention a filtering device is positioned in the piping leading from the separation device to filter particles from the liquid before it passes through the heat exchange element.

In an embodiment of the present invention the apparatus comprises a computing means for controlling the rotation of the pump and the interval (time) between each rotation.

The computing means also calculates the amount of liquid, additives and food items fed into the first winding to maintain a desired volume and ration of food items vs. liquids. This varies between different food items.

In an embodiment of the present invention the liquid for treatment of live fish, slaughtered animals or food items comprises one or more of, but not limited to water, sea water, brine, a salt-controlled and temperature controlled solution from a cooling system, fluid ice or any combination thereof.

In an embodiment of the present invention, the helical wound tubing has three to fifty windings, such as three to twenty-five windings or three to ten windings. The thickness of the tubing is determined by the amount of live fish, slaughtered animals or food items to be treated and the speed of treatment in each winding of the pump.

In an embodiment of the present invention mixing of food items, liquid and additives is performed in an in-feeding chamber for collecting items prior to transferring the food items, liquid and additives into the first winding.

In an embodiment of the present invention the weight of the food items is determined prior to feeding the food items into the in-feeding chamber to regulate the amount of food items fed into each winding before step e).

In an embodiment of the present invention the additives comprise one or more of, but not limited to anti-bacterial substances, salts, polyphosphates or any combination thereof.

In an embodiment of the present invention ozone is fed into the mixture of liquid and food items in the lower portion of the second winding of the helical wound tubing.

In an embodiment of the present invention the pressure of air in the tubing is increased as the number of windings increases and as the diameter of the tubing is increased. This also affects and increases the suction capability of the pumping device.

In an embodiment of the present invention the method for treating living salmon fish to remove sea-lice from the fish comprises the steps of: a) providing a first spiral pump device with a loading structure further comprising an ejector device, said loading structure feeding into the in-feed end of the helical wound tubing of the pumping device said spiral pump device being positioned on a platform or a structure next to a first fish farming pen, b) pumping the salmon fish from the first fish farming pen through the first spiral pump device in the liquid of the pen, separating the liquid from the salmon fish as the salmon fish exits the first spiral pump device and returning the liquid back into the pen or ocean with or without filtering, c) feeding the salmon fish into a second spiral pump device together with a first treatment liquid, said first treatment liquid being refrigerated sea water (RSW), d) transfer the salmon fish through the second spiral pump, e) separating the RSW from the salmon fish as the salmon fish exits the second spiral pump device and re-directing the RSW back to the inlet of the pump through a heat exchange element for re-use of the RSW, e) feeding the salmon fish into a third spiral pump device together with a second treatment liquid, said second treatment liquid being low in salt concentration or un-salted water at a temperature up to 28° C., f) transfer the salmon fish through the third spiral pump device, g) separating the second treatment liquid from the salmon fish as the salmon fish exits the third spiral pump device, h) transferring the salmon fish into the first or a second fish farming pen and re-directing the second treatment liquid back to the inlet of the pump through a heat exchange element for re-use of the second treatment liquid. The change in temperature between treatment steps (ΔT) together with the pressure in the pump and the effect of water and other fish rubbing against the fish aids to loosening the grip of the lice from the salmon fish and killing the lice.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 1:
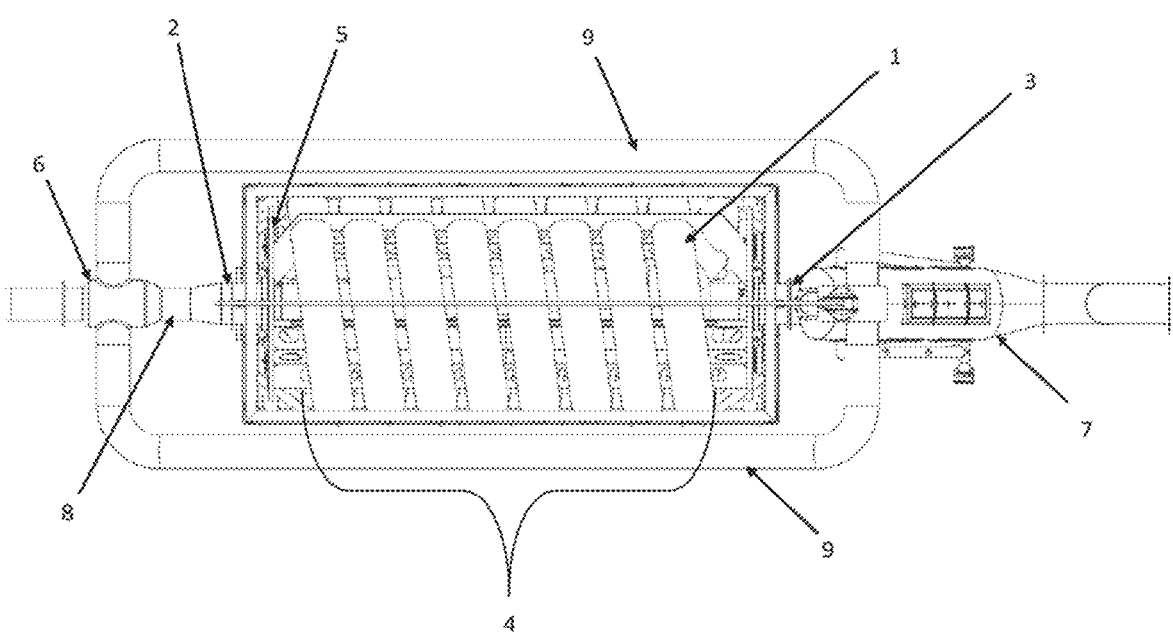
FIG. 1 is a top view of the apparatus of the present invention.

FIG. 1 shows the apparatus of the present invention with an ejector structure for in-feeding. The apparatus is a pumping device made from a helical wound tubing 1 with an in-feed end 2 and an out-feed end 3. In the embodiment shown in FIG. 1 the helical wound tubing has seven windings 4 wound around and into a cylindrical frame structure 5 rotating around the horizontal central axis of the frame structure 5. The apparatus further comprises a loading structure 6 connected to the in-feed end of the tubing for loading the first winding of the pump with food items in liquid media such as from a container or a pen for farming fish. The apparatus further comprises an out-feed structure 7 for separating at least a portion of the liquid from the food items and redirecting the liquid through piping 9 back to the loading structure 6. The loading structure has an ejector portion 8 prior to the inlet into the tubing of the pumping device to provide a suction of food items into the pumping device in addition to the suction provided by the spiral formation of the pumping device.

Figure 2:
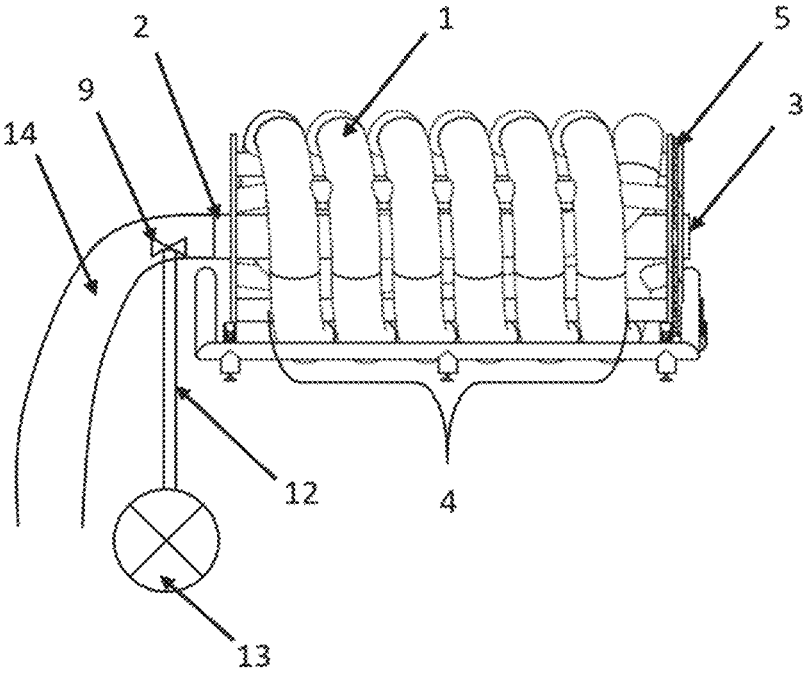
FIG. 2 is a front view of the apparatus of the present invention

FIG. 2 shows the apparatus of the present invention. The apparatus comprises a first pumping device 10a having a helical wound tubing 1 with an in-feed end 2 and an out-feed end 3. In the embodiment shown in FIG. 1 the helical wound tubing has seven windings 4 wound around and into a cylindrical frame structure 5 rotating around the horizontal central axis of the frame structure 5. The apparatus further comprises a loading channel 14 connected to the in-feed end 2 of the tubing for loading the first winding of the pump with living or slaughtered animals or food items in liquid media such as from a container or a pen for farming fish. The drawing also shows a pump tubing 12 in connection to a vacuum pump 13 further connected to the loading channel 14 via a valve 11 near the connection to the in-feed end 2 of the tubing to allow suction of the loading channel 14 and feed the first portion of living or slaughtered animals or food items in liquid media into the first winding of the pump.

Figure 3:
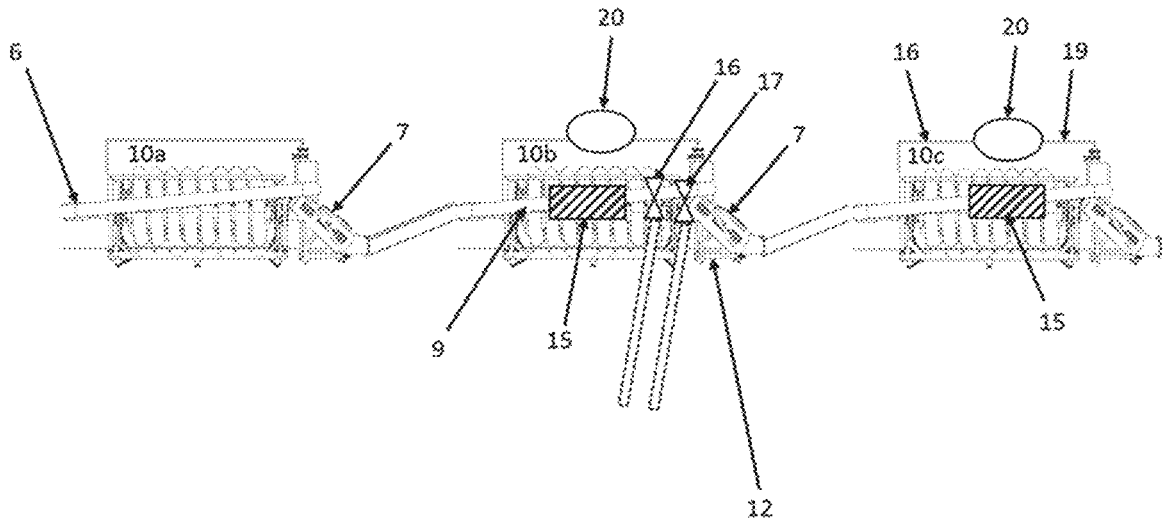
FIG. 3 is a front view of three pumping devices serially connected.

FIG. 3 shows an apparatus for treating live salmon fish in a sea pen according to one embodiment of the invention. The first pumping device 10a is the same as the pumping device described in FIG. 1, having a loading channel 6 connected to the in-feed end of the first pumping device 10a for feeding a first portion of fish in sea water into the first winding of the pump. The first pumping device 10a is serially connected to a second pumping device 10b via a out-feed structure 7 for separating the fish from the sea water. The second pumping device is a spiral pump as the first pumping device 10a and is serially connect to a third pumping device 10c via out-feed structure 7. At the outfeed end of the third pumping device 10c there is also an out-feed structure for separating the fish from the pumping liquid of the third pumping device 10c. All the pumping devices have piping 9 for circulating the liquid from the out-feed end of the tubing, after separation in the out-feed structure 7, back to the loading structure through a heat exchange element 15 maintaining the treatment temperature in the pump. In a similar manner valves 16, 17 are connected to the piping 9 for introducing concentrated salt water or pure water to adjust the salt concentration of the pumping liquid. Features shown for the second or third pumping device in this drawing apply to both devices as well as the first pumping device, although in this embodiment the sea water is not redirected to the inlet of the pump, but filtered of dead lice before pumped back into the ocean. The drawing also shows ducts 19 for circulating the air/gas phase from the out-feed end of the tubing back to the in-feed end of the tubing and means injecting additional gas or air into the duct during the recirculation. This closed circulation of air or gas in tubing/duct has a sensor and injection device 20 to monitor the gas level and inject more gas into the duct if needed to maintain a desired concentration of gas in the piping. The gas can be separated by an air/gas separating device shown here as the same separation device 17 for separating the fish from the pumping liquid at the out-feed end of the pump.

Figure 4:
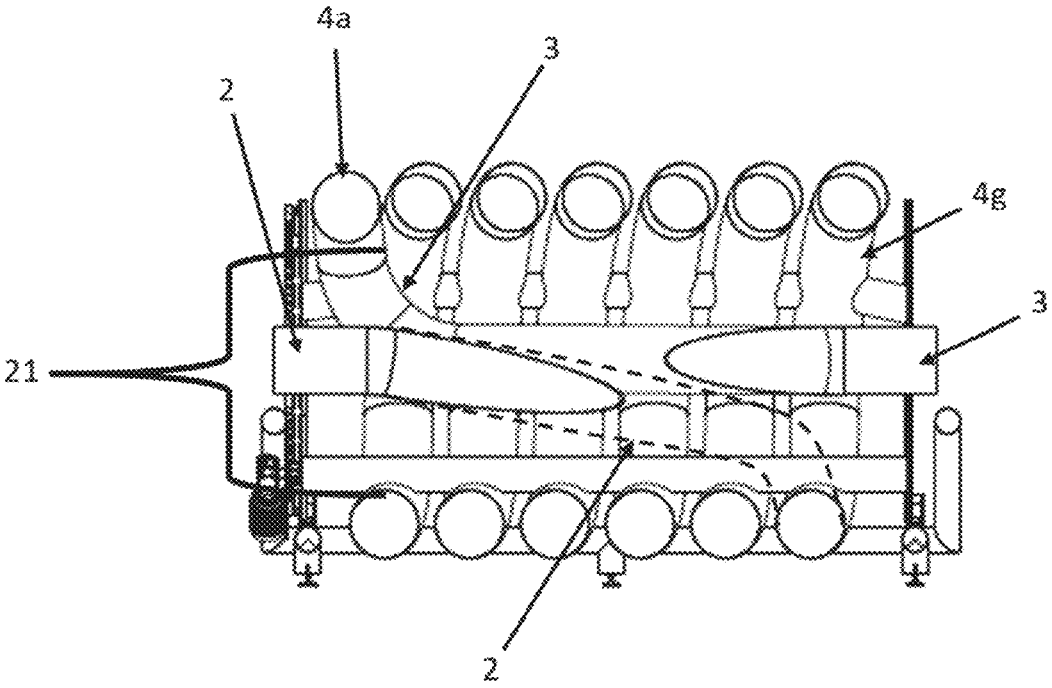
FIG. 4 is a transactional view showing a pumping device with the inlet and the outlet ends threaded through the spiral of the pump.

FIG. 4 is a transactional view showing a pumping device with the inlet 2 and the outlet 3 ends threaded through the spiral of the pump according to one embodiment of the invention. The dotted line shows how the tubing 4 is arranged to thread the in-feed end 2 through the centre space 21 of the spiral wound tubing 4 to exit by the last winding 4g of the pumping device and the out-feed end is threaded through the centre space 21 of the windings to exit by the first winding 4a of the pumping device.

Figure 5:
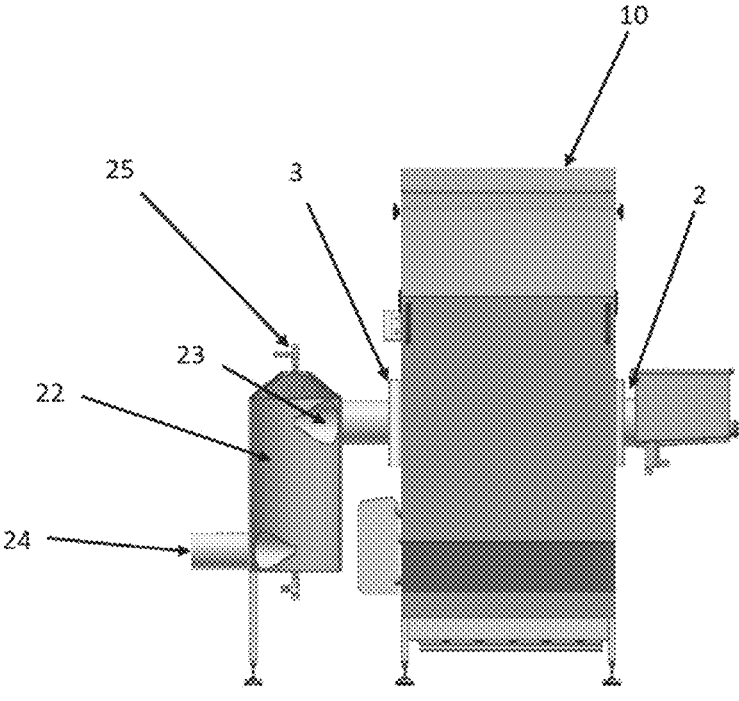
FIG. 5 shows an embodiment of an air/gas separating device for the spiral pump of the invention.

FIG. 5 shows the pumping device 10 of the present invention with one embodiment of an air/gas separating device is positioned at the out-feed end 3 of the pumping device for separating the air/gas phase from the content exiting the pump. The out-feed end 3 of the spiral pump delivers the content of the pump, including the liquid phase, the food items and the air/gas phase out of the pump and into the air/gas separating device. The air/gas separating device in this embodiment comprises container 22 having an inlet 23 at the top of a container and an outlet 24 for food items and liquid at the bottom of the container. The air/gas separating device further comprises an air/gas outlet 25 at the very top of the container 22.

Figure 6:
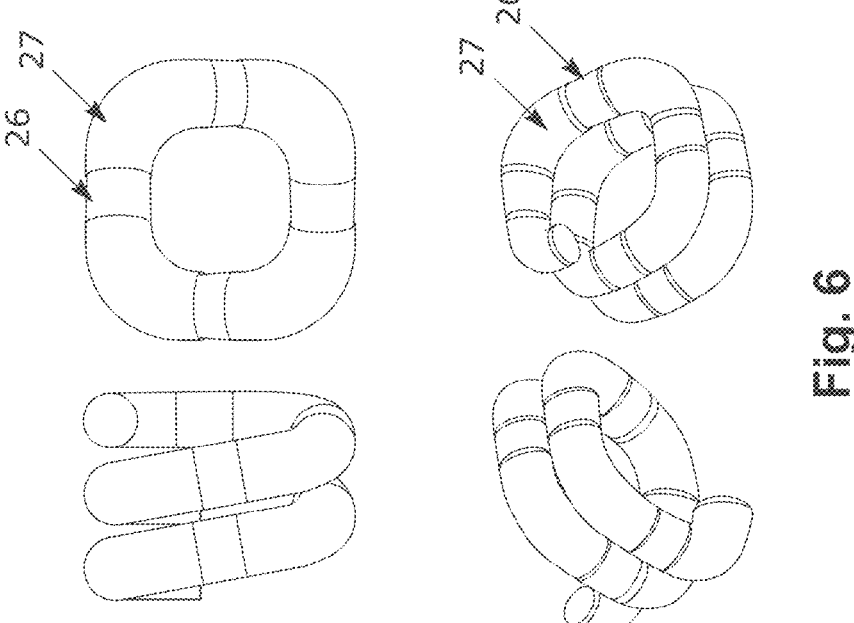
FIG. 6 is a perspective view of rectangular spirals according to one embodiment of the invention with changing diameter of the tubing.

FIG. 6 shows rectangular spirals according to one embodiment of the invention with changing diameter of the tubing. Indents or narrowing portions 26 and wider portions 27 of the tubing are continuously alternated in the formation of the spiral to form the spiral pump. The rectangular shape gives an added effect of changing the streamflow of the liquid in the pump and increases the surface stimulation of the treatment liquid and the interaction with the surface of the tubing and other fish.

Figure 7:
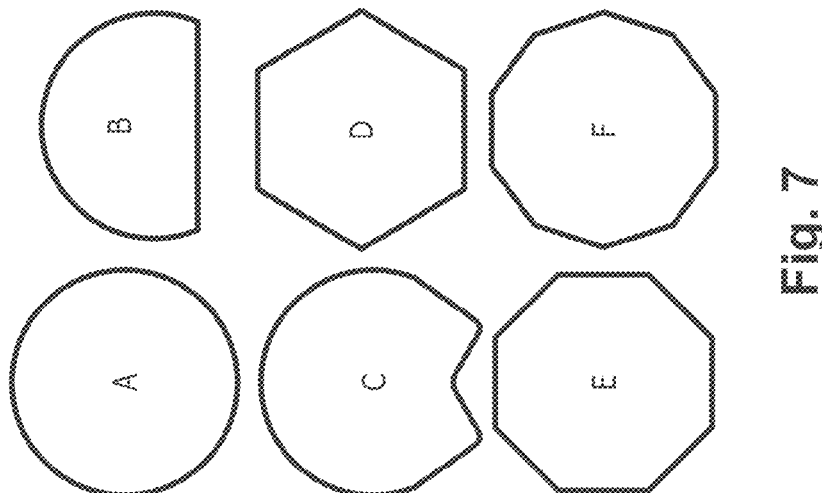
FIG. 7 shows alternative forms of one or more windings in the pump.

FIG. 7 shows examples of different forms of one or more windings in the pump. The traditional winding in a pump is circular (A), but the winding can be formed as semi-circular (B) with a flat surface, semi-circular (C) with a flat surface and a ridge in the flat surface, hexagonal (D), octagonal (E), or Decagonal (F) to create uneven movement of the food items in the winding as it goes through the rocking movement. This increases the treatment movement of liquid or air against the food items. While most of the windings in a pump may be circular, windings where treatment of food items is facilitate may be semi-circular.

Figure 8:
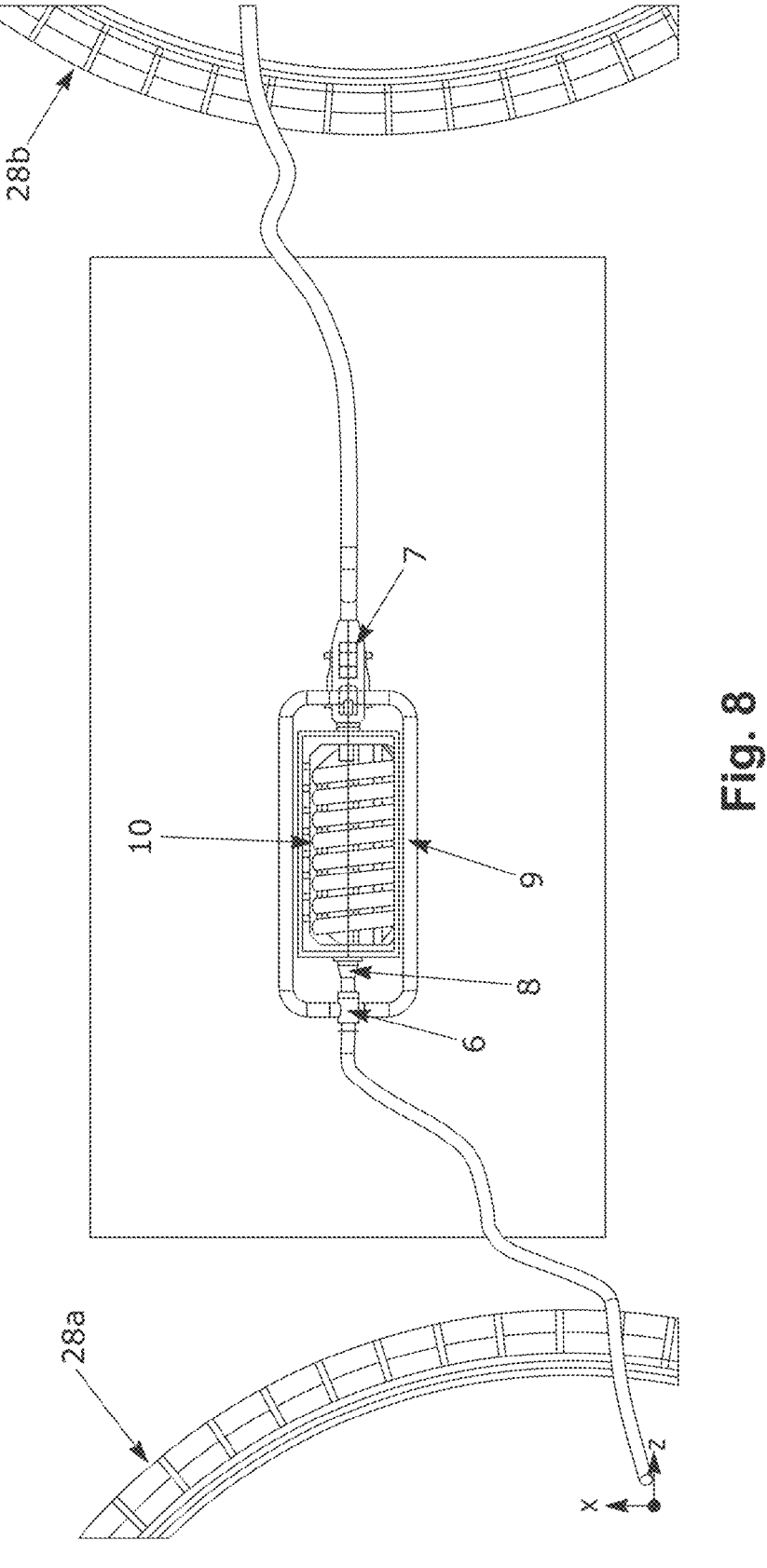
FIG. 8 shows a pumping device used for transport fish from one pen to another.

FIG. 8 shows an embodiment of the present invention used for transporting food items from one pen 28a to a second pen 28b using a pumping device 10 of the present invention. The pumping device has an out-feed structure 7 to separate liquid from fish after treatment in the pumping device 10 and tubing 9 for redirecting the separated liquid to a loading structure 6. The loading structure has an ejector portion 8 prior to the inlet into the tubing of the pumping device to provide a suction of food items into the pumping device in addition to the suction provided by the spiral formation of the pumping device.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus for treating food items in liquid media, the apparatus comprising a first pumping device comprising:

a tubing with an in-feed end and an out-feed end, said tubing being wound in a spiral having three or more windings, wherein the spiral wound tubing is arranged to be rotated around an axis, and a loading structure connected to the in-feed end of the tubing for loading the first winding of the spiral wound tubing with food items in liquid media, wherein the loading structure further comprises i) an in-feed opening for receiving food items in liquid media, ii) at least one fluid inlet to feed additional liquid into the loading structure, and iii) an ejector device arranged prior to the in-feed end of the spiral wound tubing to provide suction of food items in liquid media into the first winding of the spiral wound tubing, an out-feed structure near or at the out-feed end of the spiral wound tubing to separate a portion or all the liquid from the living or slaughtered animals or food items, wherein the out-feed structure further comprises an air/gas separating portion for separating the air/gas phase from the content exiting the pump, and wherein the apparatus further comprises a duct for circulating the air/gas phase from the out-feed structure back to the in-feed end of the tubing or the loading structure.

2. The apparatus according to claim 1, wherein the ejector device is a structure formed within the loading structure.

3. The apparatus according to claim 1, wherein the loading structure comprises one or more fluid inlets to feed additional liquid into the loading structure.

4. The apparatus according to claim 1, wherein the apparatus further comprises one or more piping for redirecting a portion or all the liquid from the out-feed structure to the loading structure.

5. The apparatus according to claim 4, further comprising means for regulating or setting the temperature and/or the salt concentration of the liquid in the piping for redirecting a portion or all the liquid from the out-feed structure to the loading structure before it is injected back into the first winding of the spiral wound tubing.

6. The apparatus according to claim 4, further comprising one or more sensing means for determining the temperature and/or the salt concentration of the liquid in the piping being redirected from the out-feed structure.

7. The apparatus according to claim 1, further comprising means injecting additional gas or air into the duct during the recirculation.

8. The apparatus according to claim 1, wherein the apparatus further comprises:

a motor, and a control means, wherein the control means controls the motor and the motor rotates the spiral wound tubing.

9. The apparatus according to claim 1, wherein the spiral wound tubing is made from metal.

10. The apparatus according to claim 1, wherein the apparatus comprises a second pumping device, said second pumping device comprising a spiral wound tubing with an in-feed end and an out-feed end, wherein said second pumping device is connected to the first pumping device to receive the food items for treatment in a second liquid.

11. The apparatus according to claim 1, wherein the apparatus comprises a third pumping device, said second pumping device comprising a spiral wound tubing with an in-feed end and an out-feed end, wherein said third pumping device is connected to the second pumping device to receive the food items for treatment in a third liquid.

12. The apparatus according to claim 10, wherein the second and/or third pumping devices further comprises an out-feed structure near or at the out-feed end of the tubing to separate the liquid and/or air-phase from the food items have been transferred.

13. The apparatus according to claim 1, wherein one or more of the pumping devices is arranged to thread the in-feed end through the centre space of the windings to enter by the last winding of the pumping device and wherein the out-feed end is threaded through the centre space of the windings to enter by the first winding of the pumping device.

14. The apparatus according to claim 1, wherein the diameter of the spiral wound tubing of one or more of the pumping devices is narrowed and widened alternatively through the winding to alternate the speed of flow in the spiral wound tubing.

15. A method for treating food items in liquid media, the method comprising:

a) providing a pumping device, said pumping device further comprising a tubing with an in-feed end and an out-feed end, said tubing being wound in a spiral having three or more windings, wherein the spiral wound tubing is arranged to be rotated around an axis, a loading structure connected to the in-feed end of the tubing for loading the first winding of the spiral wound tubing with food items in liquid media, an out-feed structure near or at the out-feed end of the spiral wound tubing to separate a portion or all the liquid from the food items, where the out-feed structure further comprises an air/gas separating portion for separating the air/gas phase from the content exiting the pump, at least one piping for redirecting a portion or all the liquid from the out-feed structure to the loading structure, and a duct for circulating the air/gas phase from the out-feed structure back to the in-feed end of the tubing or the loading structure, b) feeding a first portion of food items in liquid media through an if-feed opening in the loading structure and through the in-feed end of the piping into the first winding of the spiral wound tubing, c) rotating the frame structure a full cycle and thereby drawing a second portion of food items in liquid media into the first winding, d) separating a portion or all the liquid from the food items in the out-feed structure, e) redirecting a portion or all the liquid from the out-feed structure through the piping to the loading structure, f) repeating steps b)-e) while there are food items to be feed into the first winding of the tubing wound around the frame structure, wherein the liquid being redirected to loading structure is fed through a fluid inlet in the loading structure, and wherein an ejector device arranged prior to the in-feed end of the spiral wound tubing to provide additional suction to the suction of food items in liquid media into the first winding of the spiral wound tubing.

16. The method of claim 15, wherein a second and a third pumping devices are serially connected after the first pumping device to facilitate treatment of food items in liquid media by separating the liquid from the food items after transporting through the first pumping device and then providing a second and third pumping and treatment liquid for the second and third pumping device respectively to perform two similar or different treatment steps to the food items.

17. The method of claim 15, for treating living salmon fish, the method comprising:

a) providing the pumping device on a platform or a structure next to a first fish farming pen, b) pumping salmon fish from the first fish farming pen through the pumping device, c) separating the liquid from the salmon fish as the salmon fish exits the first spiral pump, and d) transferring the salmon fish into the first or a second fish farming pen.

18. The method of claim 17, for treating living salmon fish, the method comprising:

a) providing a first pumping device on a platform or a structure next to a first fish farming pen, b) pumping salmon fish from the first fish farming pen through the first pumping device, and c) separating the liquid from the salmon fish as the salmon fish exits the first pumping device, d) feeding the salmon fish into a second pumping device together with a first treatment liquid, e) transfer the salmon fish through the second pumping device, f) separating the first treatment liquid from the salmon fish as the salmon fish exits the second pumping device.

19. The method of claim 18, the method further comprising the steps of:

g) feeding the salmon fish into a third pumping device together with a second treatment liquid, h) transfer the salmon fish through the third pumping device, i) separating the second treatment liquid from the salmon fish as the salmon fish exits the third pumping device, j) transferring the salmon fish into the first or a second fish farming pen.

20. The method according to claim 18, wherein the first and second treatment liquids are temperature and salt regulated/controlled.

21. The method according to claim 20, wherein the temperature of the first treatment liquid is lower than the temperature of the liquid in the first fish farming pen and wherein the temperature of the second treatment liquid is higher than the temperature of the liquid in the first fish farming pen.

22. The method according to claim 18, wherein the method is performed to remove sea-lice from the fish.

* * * * *